United States Patent [19]

Masuyama et al.

[11] Patent Number: 5,510,177
[45] Date of Patent: Apr. 23, 1996

[54] MAGNETIC RECORDING MEDIUM

[75] Inventors: Kenichi Masuyama; Kazuo Kato; Hiroaki Araki, all of Kanagawa, Japan

[73] Assignee: Fuji Photo Film Co., Ltd., Kanagawa, Japan

[21] Appl. No.: 994,522

[22] Filed: Dec. 21, 1992

[30] Foreign Application Priority Data

Dec. 20, 1991 [JP] Japan .................... 3-338957

[51] Int. Cl.⁶ .................... B32B 5/16; G11B 5/66
[52] U.S. Cl. .................... 428/323; 428/328; 428/329; 428/331; 428/423.1; 428/447; 428/473.5; 428/474.4; 428/480; 428/500; 428/515; 428/522; 428/532; 428/694 B; 428/694 BP; 428/694 BN; 428/684 BA; 428/694 BM; 428/694 BG; 428/694 BR; 428/694 BC; 428/694 BU; 428/900
[58] Field of Search .................... 428/694 BR, 323, 428/329, 336, 694, 900, 694 B, 694 BF, 694 BN, 694 BA, 694 BM, 694 BG, 694 BC, 694 BU, 328, 331, 423.1, 447, 473.5, 474.4, 480, 500, 515, 522, 532

[56] References Cited

U.S. PATENT DOCUMENTS 5,001,006  3/1991  Saito et al. .................... 428/323
5,080,967  1/1992  Noguchi .................... 428/323
5,326,618  7/1994  Ryoke .................... 428/141

FOREIGN PATENT DOCUMENTS 589215  1/1983  Japan .
58-200425  11/1983  Japan .
2105327  4/1990  Japan .

OTHER PUBLICATIONS

Corresponds to U.S. Pat. No. 5,080,967.

*Primary Examiner*—Leszek Kiliman
*Attorney, Agent, or Firm*—Sughrue, Mion, Zinn, Macpeak & Seas

[57] ABSTRACT

A magnetic recording medium having two or more magnetic layers is disclosed, comprising a first magnetic layer and a second magnetic layer which-have been provided in this order on a surface of a nonmagnetic support, and which contain ferromagnetic particles and a binder, wherein said second magnetic layer (outermost layer) contains nonmagnetic particles having a pH of less than 7, and a Mohs' hardness of 6 or more, in an amount of from 1 to 20 parts by weight, per 100 parts by weight of the ferromagnetic particles in the second magnetic layer, and said first magnetic layer contains nonmagnetic particles having a pH of 7 or more, and a Mohs' hardness of 6 or more, in an amount of from 5 to 50 parts by weight, per 100 parts by weight of the ferromagnetic particles in the first magnetic layer.

11 Claims, No Drawings

MAGNETIC RECORDING MEDIUM

FIELD OF THE INVENTION

The present invention relates to a magnetic recording medium comprising a nonmagnetic support and a magnetic layer. More particularly, this invention relates to a magnetic recording medium having two or more magnetic layers.

BACKGROUND OF THE INVENTION

With the recent developments in magnetic recording, the demand for high video quality and high audio quality is becoming stronger and stronger, and improvements in electromagnetic characteristics, especially by employing finer ferromagnetic particles or heightening the loading density of ferromagnetic particles are progressing. Another requirement for improved video and audio tapes is diminished noise around carriers, and heightened C/N ratio achieved by making magnetic tape surfaces smoother. In addition, because such smoother surfaces result in increased friction coefficients, further improvements in running properties and durability are simultaneously required. Further, magnetic recording media are also required to be manufactured at low cost, since such media are being consumed in large quantities. In order to meet these requirements, a technique has been developed for forming a multilayered magnetic coating. This technique is advantageous in that proper ferromagnetic particles can be used, so as to impart high video quality-attaining properties to the upper layer and to impart high audio quality-attaining properties to the lower layer. Magnetic recording media with such a multilayered magnetic layer have, at the same time, another advantage in that they can be produced at low cost, because materials suited for the individual layers can be employed. At present, known means for improving the electromagnetic characteristics of a magnetic layer are to improve the surface properties of the magnetic layer, and to heighten the loading density of ferromagnetic particles in the magnetic layer.

As an example of a method for heightening the loading density of ferromagnetic particles in a magnetic layer, use may be made of a method in which the proportions of solid ingredients, other than ferromagnetic particles, i.e., binder, lubricant, antistatic agent, abrasive, etc., are decreased; as another example of a method for heightening the loading density of ferromagnetic particles involves dispersing the ferromagnetic particles to a high degree by means of special dispersants or dispersing equipment. However, the former method is defective in that the magnetic tape thus produced has poor physical properties, particularly has the decreased adhesion strength and tensile strength of the coating; the resulting tape also has a high friction coefficient and a high surface electrical resistance, so that the magnetic tape has significantly impaired running durability. The latter method is defective in that the dispersing step requires considerable time, and in that properties originally possessed by the ferromagnetic particles are lost; in particular, the acicular shape of the particles is destroyed, resulting in a worsened noise level and other problems. Hence, each method fails as a sufficient solution to the above problems.

In an attempt to improve electromagnetic characteristics, such as, sensitivity, and specifically in order to obtain a magnetic recording medium which has high loading density of ferromagnetic particles, without impairing physical properties of the tape, and which also has high sensitivity and high density, a technique has been proposed in JP-A-58-200425 (the term "JP-A" as used herein means an "unexamined published Japanese patent application") in which a lubricant, antistatic agent, and abrasive, additives which govern running durability, are incorporated into a second layer (upper layer), but are not incorporated into a first magnetic layer (lower layer), which does not particularly affect running durability. This magnetic recording medium gave good results with respect to S/N, head abrasion, and still durability, but has proved to be poor in running durability, because the edges of the first magnetic layer are prone to suffer damage when the tape is run with the edges sliding while undergoing friction.

On the other hand, JP-A-58-9215 discloses a magnetic recording medium comprising a surface layer containing no, or only a slight amount of, fine particles of an inorganic oxide, such as, alumina, and a lower magnetic layer containing fine particles of an inorganic oxide, such as, alumina, for the purpose of diminishing magnetic head damage or wear when the magnetic recording medium is run while in contact with the magnetic head and, further, for the purpose of improving the durability of the magnetic recording medium. According to JP-A-58-9215, the recording medium is free from the problem that, although the presence of alumina in a surface layer improves durability, the exposed alumina particles scratch or chip, or accelerate the wear, of magnetic heads. However, the above magnetic recording medium showed significantly impaired still durability, though it caused little head wear, because of the small proportion of abrasive in the second magnetic layer (upper layer).

Accordingly, for the purpose of attaining improvements in audio level, which is lowered by tape edge damage, and in still durability and S/N, which have been insufficiently achieved with the conventional techniques, the present applicant(s) proposed a magnetic recording medium comprising a second magnetic layer containing an abrasive having a Mohs' hardness of 8 or more in an amount of from 1 to 15 wt % based on the amount of ferromagnetic particles contained in the second magnetic layer, and a first magnetic layer containing an abrasive having a Mohs' hardness of less than 8 in an amount of from 5 to 50 wt % based on the amount of ferromagnetic particles contained in the first magnetic layer; the first magnetic layer also contained the abrasive in an amount larger than the amount of abrasive in the second magnetic layer (See JP-A-2-105327 corresponding to U.S. Pat. No. 5,080,967). Although this proposal proved to improve S/N and the lowering of audio level, and also to improve still durability at ordinary temperature, the proposed technique failed to attain sufficient improvements under severe conditions, such as improvements in still durability at low temperatures, e.g., −5° C., edge damage in high-humidity environments, e.g., 25° C./80% RH, and clogging in low-humidity environments, e.g., 25° C./10% RH.

Under these circumstances, intensive studies were made of physical property combinations of nonmagnetic powders to be contained in a first magnetic layer and a second magnetic layer, amounts of such nonmagnetic particles to be used, kind of binder, etc. As a result, it has been found that the above-described drawbacks can be eliminated remarkably when nonmagnetic powders having different pH values are incorporated into a first magnetic layer and a second magnetic layer, respectively. The present invention has been completed based on this finding.

SUMMARY OF THE INVENTION

An object of the present invention is to provide a magnetic recording medium which has been improved in all of electromagnetic characteristics, running durability, and still durability.

In particular, an object of the present invention is to provide a magnetic recording medium which has been improved in durability in low-temperature, low-humidity, or high-humidity environments.

The above objects of the present invention can be accomplished with a magnetic recording medium having two or more magnetic layers comprising a first magnetic layer and a second magnetic layer which have been provided in this order on a surface of a nonmagnetic support, and which contain ferromagnetic particles and a binder, wherein a) the second magnetic layer (i.e., outermost layer) contains nonmagnetic particles having a pH of less than 7, and a Mohs' hardness of 6 or more, in an amount of from 1 to 20 parts by weight per 100 parts by weight of the ferromagnetic particles in the second magnetic layer, and b) the first magnetic layer contains nonmagnetic particles having a pH of 7 or more, and a Mohs' hardness of 6 or more, in an amount of from 5 to 50 parts by weight per 100 parts by weight of the ferromagnetic particles in the first magnetic layer.

More preferably, the above objects of the present invention can be accomplished with a magnetic recording medium of the kind described above, wherein the binder contained in each of the first magnetic layer and the second magnetic layer comprises a binder containing at least one polar group selected from the group consisting of $-SO_3M$, $-OSO_3M$, $-PO(OM')_2$, $-OPO(OM')_2$, and $-COOH$, wherein M represents a hydrogen atom or an alkali metal atom, and M' represents a hydrogen atom, an alkali metal atom, or a lower hydrocarbon group.

DETAILED DESCRIPTION OF THE INVENTION

In the present invention, the incorporation of nonmagnetic particles of abrasives having a pH of less than 7 and a Mohs' hardness of 6 or more in the second magnetic layer, in an amount of from 1 to 20 parts by weight, preferably from 2 to 15 parts by weight, per 100 parts by weight of the ferromagnetic particles in the second magnetic layer, serves to maintain good running properties and durability; at the same time, the incorporation of nonmagnetic particles of abrasive having a pH of 7 or more, and a Mohs' hardness of 6 or more, in the first magnetic layer, in an amount of from 5 to 50 parts by weight, preferably from 5 to 30 parts by weight, per 100 parts by weight of the ferromagnetic particles in the first magnetic layer, serves to prevent tape damage while maintaining the good surface properties of the first magnetic layer.

If the amount of abrasives incorporated into the second magnetic layer is 1 part by weight or less per 100 parts by weight of the ferromagnetic particles, or, if the Mohs' hardness of the abrasives is 6 or less, the second magnetic layer disadvantageously shows poor abrading ability, resulting in deteriorated durability, even when the abrasives have a pH of less than 7.

Further, abrasive amounts of 20 parts by weight or more, per 100 parts by weight of ferromagnetic particles contained in the second magnetic layer, are undesirable in that such a large amount of abrasives results in too much head wear, and poor electromagnetic characteristics in the high-frequency region (i.e., in the high band).

If the amount of abrasives incorporated into the first magnetic layer is 5 parts by weight or less, per 100 parts by weight of the ferromagnetic particles contained in the second magnetic layer, or, if the Mohs' hardness of the abrasives is 6 or less, disadvantageously, no improvements can be made in tape edge damage, even when the abrasive has a pH of 7 or more. Abrasive amounts of 50 parts by weight or more, per 100 parts by weight of ferromagnetic particles contained in the first magnetic layer, are undesirable in that the first magnetic layer has deteriorated surface properties, resulting in poor electromagnetic characteristics.

Values of pH of 7 or more for the abrasive incorporated in the second magnetic layer are undesirable in that the second magnetic layer containing such the abrasives shows poor abrading ability, resulting in deteriorated running properties and durability. Due to the adoption of abrasives having a pH of less than 7, a required abrading ability can be obtained by incorporating even a small amount of the abrasives because particles of these abrasives gather around the surface of the second magnetic layer, and in addition, the loading density of ferromagnetic particles in the second magnetic layer can be heightened, because there is no need to incorporate the abrasives in a large amount, so that electromagnetic characteristics are improved.

If the pH of the abrasives incorporated into the first magnetic layer is less than 7, particles of the abrasives cannot be distributed uniformly over the edge surfaces of the tape and, as a result, no improvements are made in edge damage. Due to the adoption of abrasives having a pH of 7 or more, uniform distribution of the abrasive particles throughout the entire first magnetic layer is attained and, hence, tape edge damage is reduced.

The phenomena described above become more remarkable when the first magnetic layer and the second magnetic layer also contain a binder having an acid polar group selected from the group consisting of $-SO_3M$, $-OSO_3M$, $-PO(OM'))_2$, $-OPO(OM')_2$, and $-COOH$.

This may be because in the second magnetic layer, since a binder having an acid polar group is used in combination with acid abrasives having a pH of less than 7, the two ingredients, which both are acid, repel each other, and particles of the abrasives are apt to be present more densely on the surface of the second magnetic layer, than in the other parts of the layer, and because in the first magnetic layer, since a binder having an acid polar group is used in combination with alkaline abrasives having a pH of 7 or more, the two ingredients attract each other and the abrasives are dispersed more uniformly throughout the first magnetic layer. Therefore, the magnetic recording medium of the present invention not only shows high electromagnetic characteristics, such as, output and C/N ratio, but also is improved in all of still durability, edge damage, and clogging-(head clogging).

The second magnetic layer is the outermost layer, while the first magnetic layer may actually comprise two or more magnetic layers. Further, the magnetic recording medium of this invention may have a nonmagnetic layer provided between the second magnetic layer and the first magnetic layer. It is, however, necessary, since the functions of the second magnetic layer and the first magnetic layer are video recording (short-wavelength recording), and audio recording (long-wavelength recording), respectively, that the two layers should be positioned at a proper distance which does not inhibit the layers from performing such functions.

Examples of the nonmagnetic particles having a Mohs' hardness of 6 or more and a pH of less than 7 include $Cr_2O_3$, α-Fe$_2$O$_3$ (red iron oxide), SiC, TiO$_2$, and ZrO$_2$. It is also possible to employ particles obtained by covering nonmagnetic powder particles having a Mohs' hardness of 6 or more with Cr$_2$O$_3$, α-Fe$_2$O$_3$ (red iron oxide), SiC, or TiO$_2$ as described in JP-A-63-239616.

Examples of the nonmagnetic particles (abrasives) having a Mohs' hardness of 6 or more and a pH of 7 or more include α-Al$_2$O$_3$ and SiO$_2$. It is also possible to employ particles obtained by covering nonmagnetic powder particles having a Mohs' hardness of 6 or more with α-Al$_2$O$_3$ or SiO$_2$.

As the binder (resin) to be employed in each of the first and the second magnetic layers in the present invention, conventionally known thermoplastic resins, thermosetting resins, or reactive resins, or mixtures thereof may be used.

Thermoplastic resins which can be employed in the present invention may be ones having softening temperatures of 150° C. or less, average molecular weights of from 10,000 to 300,000, and polymerization degrees of about from 50 to 2,000. Examples of such thermoplastic resins include vinyl chloride-vinyl acetate copolymers, vinyl chloride copolymers, vinyl chloride-vinylidene chloride copolymers, vinyl chloride-acrylonitrile copolymers, acrylic acid ester-acrylonitrile copolymers, acrylic acid ester-vinylidene chloride copolymers, acrylic acid ester-styrene copolymers, methacrylic acid ester-acrylonitrile copolymers, methacrylic acid ester-vinylidene chloride copolymers, methacrylic acid ester-styrene copolymers, urethane elastomers, nylon-silicone resins, nitrocellulose-polyamide resins, poly(vinyl fluoride), vinylidene chloride-acrylonitrile copolymers, butadiene-acrylonitrile copolymers, polyamide resins, poly(vinyl butyral), cellulose derivatives (e.g., cellulose acetate butyrate, cellulose diacetate, cellulose triacetate, cellulose propionate, nitrocellulose, ethyl cellulose, methyl cellulose, propyl cellulose, methyl ethyl cellulose, carboxymethyl cellulose, and acetyl cellulose), styrene-butadiene copolymers, polyester resins, chlorovinyl etheracrylic acid ester copolymers, amino resins, thermoplastic resins of various synthetic rubber types, and mixtures thereof.

Thermosetting or reactive resins which can be employed in the present invention may be ones whose molecular weights are 200,000 or less in the stage of coating solution but are heightened to infinity through condensation, addition, or other reaction which take place when the coating solution is heated after being applied and dried. Of these resins, those which are preferred are ones which do not soften or melt before undergoing a thermal decomposition. Examples of such thermosetting or reactive resins include phenolic resins, phenoxy resins, epoxy resins, thermosetting polyurethane resins, urea resins, melamine resins, alkyd resins, silicone resins, reactive acrylic resins, epoxy-polyamide resins, nitrocellulose-melamine resins, mixtures of a high-molecular-weight polyester resin and an isocyanate prepolymer, mixtures of a methacrylate copolymer and a diisocyanate prepolymer, mixtures of a polyester polyol and a polyisocyanate, urea-formaldehyde resins, mixtures of low-molecular-weight glycol/a high-molecular-weight diol/triphenylmethane triisocyanate, polyamine resins, polyimine resins, and mixtures thereof.

The binders employed in the present invention comprise binders containing, in the backbone thereof which may be any of the aforementioned resins, at least one polar group selected from the group consisting of —SO$_3$M, —OSO$_3$M, —PO(OM')$_2$, —OPO(OM')$_2$, and —COOH (wherein M represents a hydrogen atom or an alkali metal atom, e.g., Li, Na, or K, and M' represents a hydrogen atom, an alkali metal atom, e.g., Li, Na, or K, or a lower hydrocarbon group having from 1 to 5 carbon atoms).

The amount of the polar group contained in the binder may be preferably from $1 \times 10^{-1}$ to $1 \times 10^{-8}$ mol/g, more preferably from $1 \times 10^{-2}$ to $1 \times 10^{-6}$ mol/g.

Although the binder for each magnetic layer may consist of a single binder polymer, it is also possible to use two or more binder polymers in combination. For example, it is preferred to employ a combination of a relatively rigid binder, such as, a vinyl chloride copolymer or a cellulose derivative, and a relatively soft and elastic binder, such as, a polyurethane resin or a polyester resin. In this case, the polar group described above may be contained in only one of these binders. It is also possible that all of these binders contain the polar group in order to improve dispersibility or other properties.

Examples of the polyisocyanates that can be used in the binders of the present invention include isocyanates, such as, tolylene diisocyanate, 4,4'-diphenylmethane diisocyanate, hexamethylene diisocyanate, xylylene diisocyanate, naphthylene 1,5-diisocyanate, o-toluidine diisocyanate, isophorone diisocyanate, and triphenylmethane triisocyanate, products of the reactions of the above-mentioned isocyanates with polyalcohols, and dimer to 15-mer isocyanates formed through condensation of isocyanates. The average molecular weights of these polyisocyanates are preferably from 100 to 20,000. These polyisocyanates are commercially available under the trade names of: Coronate L, Coronate HL, Coronate 2030, Coronate 2031, Millionate MR, and Millionate MTL (manufactured by Nippon Polyurethane Co., Ltd., Japan); Takenate D-102, Takenate D-110N, Takenate D-200, Takenate D-202, Takenate 300S, and Takenate 500 (manufactured by Takeda Chemical Industries Co., Ltd., Japan); and Sumidule T-80, Sumidule 44S, Sumidule PF, Sumidule L, Sumidule N, Desmodule L, Desmodule IL, Desmodule N, Desmodule HL, Desmodule T-65, Desmodule 15, Desmodule R, Desmodule RF, Desmodule SL, and Desmodule Z4273 (manufactured by Sumitomo Bayer Co., Ltd., Japan). These may be used alone, or in combinations of two or more thereof, taking advantage of a difference in curing reactivity. For the purpose of accelerating the curing reaction, such a polyisocyanate may be used in combination with a hydroxyl group-containing compound (e.g., butanediol, hexanediol, a polyurethane having a molecular weight of from 1,000 to 10,000, or water), an amino group-containing compound (e.g., monomethylamine, dimethylamine, or trimethylamine), or a metal oxide catalyst. These hydroxyl group- or amino group-containing compounds desirably are polyfunctional. It is preferable that those polyisocyanates be used in an amount of from 5 to 40 wt % based on the total amount of the binder.

Examples of the ferromagnetic fine particles to be employed in the present invention include magnetic metal oxides, metals, metal alloys and mixtures thereof comprising particles of known ferromagnetic materials such as γ-Fe$_2$O$_3$, Co-containing (-adsorbed, -modified, or -doped) γ-Fe$_2$O$_3$, Fe$_3$O$_4$, Co-containing (-adsorbed, -modified, or -doped) Fe$_3$O$_4$, FeO$_x$, Co-containing (-adsorbed, -modified, or -doped) FeO$_x$ (x=1.33 to 1.50), CrO$_2$, CrO$_2$ containing at least one of Rn, Te, Sb, Sr, Fe, Ti, V, Mn, and Cr$_2$O$_3$, Fe, Co, Ni, Fe—Co alloys, Fe—Ni alloys, Fe—Co—Ni alloys, Co—Ni—P alloys, Co—Ni—Fe—B alloys, Fe—Ni—Zn alloys, Ni—Co alloys, Co—Ni—Fe alloys, Fe—N alloys, Fe—Co—Cr alloys, and Mn—Bi alloys.

Such ferromagnetic particles may have sizes such that the particle lengths are about from 0.005 to 1 micron and the length in the long axis/length in the short axis ratios are about from 1/1 to 50/1. Further, these ferromagnetic particles may have a specific surface area ($S_{BET}$) of about from 1 $m^2/g$ to 70 $m^2/g$ and a water content of from 0.2 to 2.0 wt %. In the case where ferromagnetic particles of any of the above-mentioned kinds are used to prepare a coating solution, the water content of this coating solution may be from 0.00 to 2.00 wt %. Before ferromagnetic particles of any of the aforementioned kinds are dispersed, a dispersant, lubricant, antistatic agent, and the like, which will be described later, may be allowed to be adsorbed onto surfaces of the ferromagnetic particles for their respective purposes, by impregnating the particles with these additives in a solvent. It is preferable that ferromagnetic particles of the above-mentioned kinds contain a heavy metal, such as, Sr, Pb, Mn, Ni, Cd, Cr, Al, Si, Ti, Cu, or Zn, in an amount up to 1 wt %. These ferromagnetic particles may also contain alumina or the like adhered or fused thereto.

In the present invention, it is preferred that the ferromagnetic particles contained in the second magnetic layer be ferromagnetic metal particles having a specific surface area, as measured by the BET method, of 45 $m^2/g$ or more and particularly 50 $m^2/g$ or more.

Examples of the lubricant and antioxidant which can be employed in the first and second magnetic layers in the present invention include fine particles of inorganic materials, such as, molybdenum disulfide, boron nitride, graphite fluoride, calcium carbonate, barium sulfate, silicon oxide, titanium oxide, zinc oxide, tin oxide, and tungsten disulfide; resin fine particles, such as, acryl-styrene, benzoguanamine, melamine, polyolefin, polyester, polyamide, polyimide, and poly(ethylene fluoride); organic compound lubricants may be used, such as, silicone oils, fatty acid-modified silicone oils, graphite, fluorine-containing alcohols, polyolefins (e.g., polyethylene wax), polyglycols (e.g., poly(ethylene oxide) wax), tetrafluoroethylene oxide wax, polytetrafluoro glycol, perfluorofatty acids, perfluorofatty acid esters, perfluoroalkylsulfuric acid esters, perfluoroalkylphosphoric acid esters, alkylphosphoric acid esters, poly(phenyl ether)s, fatty acid esters consisting of a monobasic fatty acid having from 10 to 20 carbon atoms and one or more of a monohydric alcohol, dihydric alcohol, trihydric alcohol, tetrahydric alcohol, and hexahydric alcohol having from 3 to 12 carbon atoms, and fatty acid esters consisting of a monobasic fatty acid having 10 or more carbon atoms and a monohydric to hexahydric alcohol having carbon atoms in such a number that the sum of the carbon atoms in the alcohol and those in the fatty acid is from 11 to 28. Further, a fatty acid, fatty acid amide, and aliphatic alcohol, each having from 8 to 22 carbon atoms, are also usable.

Specific examples of these organic compound lubricants include butyl caprylate, octyl caprylate, ethyl laurate, butyl laurate, octyl laurate, ethyl myristate, butyl myristate, octyl myristate, ethyl palmitate, butyl palmitate, octyl palmitate, ethyl stearate, butyl stearate, octyl stearate, amyl stearate, anhydrosorbitan monostearate, anhydrosorbitan distearate, anhydrosorbitan tristearate, anhydrosorbitan tetrastearate, anhydrosorbitan ethylene oxide monostearate, oleyl oleate, oleyl alcohol, and lauryl alcohol. These may be used alone or in combination.

Furthermore, so-called lubricating oil additives may also be employed, alone or in combination, as the lubricant in the present invention. Examples of such lubricating oil additives include antioxidants (e.g., alkylphenols), rust preventives (e.g., naphthenic acid, alkenylsuccinic acids, and dilauryl phosphate), oiliness improvers (e.g., rape seed oil and lauryl alcohol), extreme pressure additives (e.g., dibenzyl sulfide, tricresyl phosphate, and tributyl phosphite), detergent dispersants, viscosity index improvers, pour point depressants, and defoaming agents. These lubricants may be incorporated in an amount in the range of from 0.05 to 20 parts by weight, per 100 parts by weight of the binder.

A carbon black, such as, for example, furnace black for rubbers, thermal black for rubbers, coloring black, or acetylene black may be used in the present invention. Examples of abbreviations for these carbon blacks in the United States include SAF, ISAF, IISAF, T, HAF, SPF, FF, FEF, HMF, GPF, APF, SRF, MPF, ECF, SCF, CF, FT, MT, HCC, HCF, MCF, LFF, and RCF. Carbon blacks which fall under ASTM D-1765-82a are also usable. The carbon black to be employed in this invention may have an average particle size of from 5 to 1,000 mµ (electron microscope), a specific surface area as measured by the nitrogen adsorption method of from 1 to 1,500 $m^2/g$, a pH of from 2 to 13 (JIS K-6221, 1982), and an oil absorption (amount) as measured with dibutyl phthalate (DBP), of from 5 to 2,000 ml/100 g (according to JIS K-6221, 1982). The water content of the carbon black to be employed in this invention may be from 0.00 to 20 wt %.

Proper particle sizes for carbon blacks to be used in the present invention are as follows. A carbon black of from 5 to 100 mµ may be used to reduce the surface electrical resistance of a coating film, while a carbon black of from 50 to 1,000 mµ may be used to control the strength of a coated film. Further, a fine carbon black (100 mµ or smaller) may be used to control the surface roughness of a coated film and to attain surface smoothness for reducing the spacing loss, while a coarse carbon black (50 mµ or larger) may be used to roughen the surface of a coated film to decrease its coefficient of friction. Thus, carbon blacks of different kinds are properly used in proper amounts according to the purpose of the magnetic recording medium to be produced.

These carbon blacks may be surface-treated with a dispersant or other agent or grafted with a resin before use. Further, use may also be made of a carbon black whose surfaces have been partly graphitized by a method in which the carbon black is treated at a temperature of 2,000° C. or more in a furnace in which the carbon black is being produced. Moreover, as a special carbon black, a hollow one may also be used.

It is desirable that these carbon blacks be used in an amount of from 0.1 to 20 parts by weight per 100 parts by weight of the ferromagnetic particles in the magnetic layer. With respect to carbon blacks usable in the present invention and physical properties thereof, reference may be made, for example, to "Carbon Black Binran (Carbon Black Handbook)" edited by Carbon Black Association, Japan (published in 1971).

Examples of solvents which can be used in dispersion, kneading, and coating for producing the magnetic recording medium of the present invention include ketone-type solvents, such as acetone, methyl ethyl ketone, methyl isobutyl ketone, cyclohexanone, isophorone, and tetrahydrofuran; alcohol-type solvents, such as, methanol, ethanol, propanol, butanol, isobutyl alcohol, isopropyl alcohol, and methylcyclohexanol; ester-type solvents, such as, methyl acetate, ethyl acetate, butyl acetate, isobutyl acetate, isopropyl acetate, ethyl lactate, and glycol acetate monoethyl ethers; ether-type solvents, such as, diethyl ether, tetrahydrofuran, glycol dimethyl ethers, glycol monoethyl ethers, and dioxane; tar-type (aromatic hydrocarbon) solvents, such as, benzene, toluene, xylene, cresol, chlorobenzene, and styrene; chlorinated hydrocarbons, such as, methylene chloride, ethylene chloride, carbon tetrachloride, chloroform, ethylene chlorohydrin, and dichlorobenzene; and other compounds, such as, N,N-dimethylformamide and hexane. These solvents may be used in arbitrary proportions.

The kneading method is not particularly limited, and the sequence of ingredient addition can be suitably determined. For preparing magnetic coating solutions and a coating solution for forming a backing layer, an ordinary kneading machine may be used. Examples of the kneading machine include a two-roll mill, a three-roll mill, a ball mill, a pebble mill, a Trommel, a sand grinder, a Szegvari, attritor, a high-speed impeller, a dispersing machine, a high-speed stone mill, a high-speed impact mill, a disper, a kneader, a high-speed mixer, a ribbon blender, a co-kneader, an intensive mixer, a tumbler, a blender, a disperser, a homogenizer, a single-screw extruder, a twin-screw extruder, and an ultrasonic dispersing machine.

Details of kneading and dispersing techniques are described in "Paint Flow and Pigment Dispersion" written by T. C. Patton, published by John Wiley & Sons in 1964; "Kogyo Zairyo (Industrial Materials)" vol. 25, 37 (1977), written by Shin-ichi Tanaka; and in references cited in these books. Two or more of these kneading or dispersing machines may suitably be combined to continuously feed and apply coating solutions in order to conduct continuous treatment. Reference may further be made to U.S. Pats. 2,581,414 and 2,855,156. In the present invention also, kneading and dispersion can be performed according to any of the methods described in the above-mentioned books and references cited therein, to prepare magnetic coating solutions and a coating solution for a backing layer.

In forming the magnetic layers, the ingredients described above and other ingredients may be combined in arbitrary proportions and dissolved in an organic solvent; the resulting solutions are next applied, as coating compositions, on a support, and are then dried.

In the case where the magnetic recording medium to be produced is for use as a tape, the thickness of the support is generally about from 2.5 to 100 microns, preferably about from 3 to 70 microns. In the case of a disk- or card-form magnetic recording medium, the thickness is generally about from 0.03 to 10 mm. In the case of a drum, a cylindrical support may be employed. Examples of materials for use as the support include polyesters, such as, poly(ethylene terephthalate) and poly(ethylene naphthalate), polyolefins, such as, polypropylene and polyethylene, cellulose derivatives, such as, cellulose triacetate and cellulose diacetate, vinyl resins, such as, poly(vinyl chloride) and poly(vinylidene chloride), other plastics, such as, polycarbonates, polyamides, and polysulfone, metals such as aluminum and copper, and ceramics, such as, glass. Before coating, these supports may be subjected to treatments, such as, corona discharge, plasma contact, undercoating, heating, dust-removal, metal deposition, or alkali contact.

With respect to the aforementioned supports, reference may be made, for example, to West German Patent 3338854A, JP-A-59-116926, U.S. Pat. No. 4,388,368, and "Sen-i to Kogyo (Fibers and Industry)" vol. 31, pp. 50–55 (1975) written by Yukio Mitsuishi.

Examples of coating techniques that can be used for forming the above-described magnetic layers and backing layers on a support include air doctor coating, blade coating, air knife coating, squeeze coating, impregnation coating, reverse roll coating, transfer roll coating, gravure coating, kiss coating, cast coating, spray coating, bar coating, and spin coating. Other coating techniques may also be used.

These coating techniques are explained in detail in "Coating Kogyo (Coating Industry)" pp. 253–277, published by Asakura Shoten, Japan in March 20, 1971. It is particularly preferable in the present invention to employ a so-called wet-on-wet coating method in which a lower layer-forming coating solution is applied and an upper layer-forming coating solution is then coated directly on the lower layer (coating solution) which is still in a wet state.

The wet-on-wet coating method which is used may be the coating technique described in JP-A-61-139929.

Further, for the details of the above-described method of dispersing ferromagnetic particles in a binder, and the method of applying a coating solution on a support, reference may be made to JP-A-54-46011 and JP-A-54-21805.

The magnetic layer coating solutions formed on a support by the method described above, if required, are immediately subjected to a treatment in which the ferromagnetic particles present in the layers are oriented into a desired direction with drying, and the magnetic layers formed are then dried. In the above procedure, the traveling speed for the support is generally from 10 m/min to 1,000 m/min and the drying temperature is regulated in the range of from 20° C. to 130° C. If desired, the thus-obtained web is subjected to a surface-smoothing treatment and cut into a desired shape. Thus, a magnetic recording medium according to the present invention is produced. It is preferable that the above-described production method be practiced by continuously performing the steps of filler surface treatment, kneading and dispersion, coating, heat treatment, calendering, irradiation (EB) treatment, surface polishing treatment, and cutting. If necessary, these steps may be divided into some groups.

In these steps, the temperature and humidity are regulated. Specifically, the temperature is regulated in the range of from 10° C. to 130° C., and the humidity in the range of from 5 mg/m$^3$ to 20 mg/m$^3$ in terms of moisture amount in the air. These conditions are described, for example, in JP-B40-23625, JP-B-39-28368 (the term "JP-B" as used herein means an "examined Japanese patent publication"), and in U.S. Pat. No. 3,473,960. It is thought that the method described in JP-B-41-13181 is a basic and important technique in this field.

The present invention will be illustrated below in more detail with reference to the following Examples and Comparative Examples. It will be apparent to one skilled in the art that various changes and modifications can be made in the ingredients, ingredient proportions, procedures, etc. shown below without departing from the spirit of the invention.

Therefore, the present invention should be understood not to be limited to the following Examples. In the Examples and Comparative Examples, all parts are by weight.

EXAMPLE 1

| Lower Layer Coating Solution: | |
| --- | --- |
| Co—FeO$_x$ (H$_c$ = 800 Oe, S$_{BET}$ = 43 m$^2$/g, x = 1.4) | 100 parts |
| Vinyl chloride copolymer (containing —PO(ONa)$_2$ group as functional group) | 15 parts |
| Polyester polyurethane ("UR-4300" manufactured by Toyobo Co., Ltd., Japan) | 5 parts |
| Polyisocyanate ("Coronate L" manufactured by Nippon Polyurethane Co., Ltd., Japan) | 7 parts |
| Stearic acid (industrial grade) | 1 part |
| Butyl stearate (industrial grade) | 3 parts |
| Abrasive, α-Al$_2$O$_3$ (pH = 9.5, average particle diameter = 0.5 μm) | 15 parts |
| Carbon black (average particle diameter = 20 mμ) | 5 parts |
| Methyl ethyl ketone | 160 parts |
| Cyclohexanone | 80 parts |

11
-continued

| Upper Layer Coating Solution: | |
|---|---|
| Ferromagnetic alloy powder ($H_c$ = 1,600 Oe, $S_{BET}$ = 52 m$^2$/g) | 100 parts |
| Vinyl chloride copolymer (containing —PO(ONa)$_2$ group as functional group) | 15 parts |
| Polyester polyurethane ("UR-4300" manufactured by Toyobo Co., Ltd.) | 5 parts |
| Polyisocyanate ("Coronate L" manufactured by Nippon Polyurethane Co., Ltd.) | 7 parts |
| Stearic acid (industrial grade) | 1 part |
| Butyl stearate (industrial grade) | 3 parts |
| Carbon black (average particle diameter = 20 mµ) | 5 parts |
| Abrasive, Cr$_2$O$_3$ (pH = 4.5, average particle diameter = 0.5 µm) | 4 parts |
| Methyl ethyl ketone | 200 parts |
| Cyclohexanone | 100 parts |

EXAMPLES 2 TO 5

| Lower Layer Coating Solution: | |
|---|---|
| Co—FeO$_x$ ($H_c$ = 800 Oe, $S_{BET}$ = 43 m$^2$/g, x = 1.4) | 100 parts |
| Vinyl chloride copolymer ("MR-110" manufactured by Nippon Zeon Co., Ltd., Japan) | 15 parts |
| Polyester polyurethane ("UR-5500" manufactured by Toyobo Co., Ltd.) | 5 parts |
| Polyisocyanate ("Coronate L" manufactured by Nippon Polyurethane Co., Ltd.) | 6.7 parts |
| Abrasive (shown in TABLE 1) | 2 parts |
| Myristic acid (industrial grade) | 2 parts |
| Butyl stearate (industrial grade) | 1 part |
| Carbon black (average particle size and content thereof are shown in TABLE 1) | 3 parts |
| Methyl ethyl ketone | 160 parts |
| Cyclohexanone | 80 parts |
| Upper Layer Coating Solution: | |
| Ferromagnetic alloy powder ($H_c$ = 1,600 Oe, $S_{BET}$ = 52 m$^2$/g) | 100 parts |
| Vinyl chloride copolymer ("MR-110" manufactured by Nippon Zeon Co., Ltd.) | 15 parts |
| Polyester polyurethane ("UR-5500" manufactured by Toyobo Co., Ltd.) | 5 parts |
| Polyisocyanate ("Coronate L" manufactured by Nippon Polyurethane Co., Ltd.) | 6.7 parts |
| Myristic acid (industrial grade) | 2 parts |
| Butyl stearate (industrial grade) | 1 part |
| Abrasive (shown in TABLE 1) | 5 parts |
| Carbon black (average particle size = 80 mµ) | 1 part |
| Methyl ethyl ketone | 200 parts |
| Cyclohexanone | 100 parts |

COMPARATIVE EXAMPLE 1

| Lower Layer Coating Solution: | |
|---|---|
| Co—FeO$_x$ ($H_c$ = 800 Oe, $S_{BET}$ = 43 m$^2$/g, x = 1.4) | 100 parts |
| Vinyl chloride copolymer (containing —OH group as functional group) | 15 parts |
| Polyester polyurethane ("N2304" manufactured by Nippon Polyurethane Co., Ltd.) | 5 parts |
| Polyisocyanate ("Coronate L" manufactured by Nippon Polyurethane Co., Ltd.) | 7 parts |
| Stearic acid (industrial grade) | 1 part |
| Butyl stearate (industrial grade) | 3 parts |
| Carbon black (average particle diameter = 20 mµ) | 5 parts |
| Methyl ethyl ketone | 160 parts |
| Cyclohexanone | 80 parts |
| Upper Layer Coating Solution: | |
| Ferromagnetic alloy powder ($H_c$ = 1,600 Oe, $S_{BET}$ = 52 m$^2$/g) | 100 parts |
| Vinyl chloride copolymer (containing —OH group as functional group) | 15 parts |
| Polyester polyurethane ("N2304" manufactured by Nippon Polyurethane Co., Ltd.) | 5 parts |
| Polyisocyanate ("Coronate L" manufactured by Nippon Polyurethane Co., Ltd.) | 7 parts |
| Stearic acid (industrial grade) | 1 part |
| Butyl stearate (industrial grade) | 3 parts |
| Carbon black (average particle diameter = 20 mµ) | 5 parts |
| Abrasive, α-Al$_2$O$_3$ (pH = 9.5, average particle diameter = 0.5 µm) | 10 parts |
| Methyl ethyl ketone | 160 parts |
| Cyclohexanone | 80 parts |

COMPARATIVE EXAMPLE 2

| Lower Layer Coating Solution: | |
|---|---|
| Co—FeO$_x$ ($H_c$ = 800 Oe, $S_{BET}$ = 43 m$^2$/g, x = 1.4) | 100 parts |
| Vinyl chloride copolymer (containing —COOH group as functional group) | 15 parts |
| Polyester polyurethane ("N2304" manufactured by Nippon Polyurethane Co., Ltd.) | 5 parts |
| Polyisocyanate ("Coronate L" manufactured by Nippon Polyurethane Co., Ltd.) | 7 parts |
| Stearic acid (industrial grade) | 1 part |
| Butyl stearate (industrial grade) | 3 parts |
| Abrasive, α-Al$_2$O$_3$ (pH = 9.5, average particle diameter = 0.5 µm) | 10 parts |
| Carbon black (average particle diameter = 20 mµ) | 5 parts |
| Methyl ethyl ketone | 160 parts |
| Cyclohexanone | 80 parts |
| Upper Layer Coating Solution: | |
| Ferromagnetic alloy powder ($H_c$ = 1,600 Oe, $S_{BET}$ = 52 m$^2$/g) | 100 parts |
| Vinyl chloride copolymer (containing —OH group as functional group) | 15 parts |
| Polyester polyurethane ("N2304" manufactured by Nippon Polyurethane Co., Ltd.) | 5 parts |
| Polyisocyanate ("Coronate L" manufactured by Nippon Polyurethane Co., Ltd.) | 7 parts |
| Stearic acid (industrial grade) | 1 part |
| Butyl stearate (industrial grade) | 3 parts |
| Carbon black (average particle diameter = 20 mµ) | 5 parts |
| Abrasive, α-Al$_2$O$_3$ (pH = 9.5, average particle diameter = 0.5 µm) | 4 parts |
| Methyl ethyl ketone | 200 parts |
| Cyclohexanone | 100 parts |

COMPARATIVE EXAMPLE 3

| Lower Layer Coating Solution: | |
|---|---|
| Co—FeO$_x$ ($H_c$ = 800 Oe, $S_{BET}$ = 43 m$^2$/g, x = 1.4) | 100 parts |
| Vinyl chloride copolymer (containing —SO$_2$Na group as functional group) ("MR-110" manufactured by Nippon Zeon Co., Ltd.) | 15 parts |
| Polyester polyurethane ("UR-5500" manufactured by Toyobo Co., Ltd.) | 5 parts |
| Polyisocyanate ("Coronate L" manufactured by Nippon Polyurethane Co., Ltd.) | 7 parts |
| Stearic acid (industrial grade) | 1 part |
| Butyl stearate (industrial grade) | 3 parts |
| abrasive, α-Fe$_2$O$_3$ (pH = 9.0, average particle diameter = 0.5 µm) | 15 parts |
| Carbon black (average particle diameter = 20 mµ) | 5 parts |
| Methyl ethyl ketone | 160 parts |
| Cyclohexanone | 80 parts |
| Upper Layer Coating Solution: | |
| Ferromagnetic alloy powder ($H_c$ = 1,600 Oe, $S_{BET}$ = 52 m$^2$/g) | 100 parts |
| Vinyl chloride copolymer (containing —SO$_3$Na group as functional group) ("MR-110" | 15 parts |

-continued

| | |
|---|---|
| manufactured by Nippon Zeon Co., Ltd.) | |
| Polyester polyurethane ("UR-5500" manufactured by Toyobo Co., Ltd.) | 5 parts |
| Polyisocyanate ("Coronate L" manufactured by Nippon Polyurethane Co., Ltd.) | 7 parts |
| Stearic acid (industrial grade) | 1 part |
| Butyl stearate (industrial grade) | 3 parts |
| Carbon black (average particle diameter = 20 mµ) | 5 parts |
| Abrasive, α-$Al_2O_3$ (pH = 9.5, average particle diameter = 0.5 µm) | 2 parts |
| Methyl ethyl ketone | 200 parts |
| Cyclohexanone | 100 parts |

Each of the above compositions was sufficiently mixed to disperse the ingredients, thereby preparing a magnetic coating solution. In each example, the magnetic coating solutions were coated on a 7 µm-thick poly(ethylene terephthalate) support in such amounts that the resulting upper layer and lower layer came to have thicknesses of 0.4 µm and 25 µm, respectively, after surface-smoothing treatment. The coating solutions applied were dried and surface-smoothing treatment was then performed, followed by slitting into 8-mm width. Thus, magnetic recording media of Examples 1 to 5 and Comparative Examples 1 to 3 were obtained.

The magnetic recording media of the Examples and the Comparative Examples were evaluated as shown below, and the results obtained are shown in Table 1.

TABLE 1

| | Second of magnetic layer (upper layer) | | | | First magnetic layer (lower layer) | | | | Binder | Electromagnetic characteristics | | Still Durability | Edge damage | Clogging |
|---|---|---|---|---|---|---|---|---|---|---|---|---|---|---|
| | Kind of Ferromagnetic particle | Abrasive | | | Kind of Ferromagnetic particle | Abrasive | | | (functional group) | Output (7M) | C/N | | | |
| | | Kind (Mohs' hardness) | pH | Amount by weight | | Kind (Mohs' hardness) | pH | Amount by weight | | | | | | |
| Example 1 | metal | Cr₂O₃ (8.5) | 4.5 | 4 | Co—FeOₓ (x = 1.4) | — | 9.7 | 15 | —PO(ONa)₂ | G +3.3 | +2.2 | G 120' or more | G | G |
| Example 2 | metal | Cr₂O₃ (8.5) | 4.2 | 10 | Co—FeOₓ (x = 1.4) | α-Al₂O₃ (9) | 9.7 | 20 | —SO₃Na | M +2.5 | +1.8 | G 120' or more | G | G |
| Example 3 | metal | Cr₂O₃-adsorbed α-Al₂O₃ (9) | 5.2 | 2.5 | Co—FeOₓ (x = 1.4) | α-Al₂O₃ (9) | 9.2 | 25 | —SO₃Na | G +3.5 | +2.5 | G 120' or more | G | G |
| Example 4 | metal | α-Fe₂O₃-adsorbed TiC (8) | 5.5 | 5 | Co—FeOₓ (x = 1.4) | SiO₂ (7) | 9.5 | 30 | —SO₃Na | G +3.1 | +2.0 | G 120' or more | G | G |
| Example 5 | metal | Cr₂O₃-adsorbed SiC (9.5) | 5.0 | 3.5 | Co—FeOₓ (x = 1.4) | Al₂O₃-adsorbed SiC (9) | 9.5 | 20 | —SO₃Na | G +3.3 | +2.2 | G 120' or more | G | G |
| Comparative Example 1 | metal | α-Al₂O₃ (9) | 9.5 | 10 | Co—α-Al₂O₃ (x = 1.4) | α-Al₂O₃ (9) | — | 0 | —OH | M +2.5 | +1.7 | M 15' | B | M |
| Comparative Example 2 | metal | α-Al₂O₃ (9) | 9.5 | 4 | Co—FeOₓ (x = 1.4) | α-Al₂O₃ (9) | 9.5 | 10 | —COOH | G +3.0 | +2.0 | B 10' | G | B |
| Comparative Example 3 | metal | α-Al₂O₃ (9) | 9.5 | 2 | Co—FeOₓ (x = 1.4) | α-Fe₂O₃ (5.5) | 9.0 | 15 | —SO₃Na | G +3.1 | +2.2 | B 3' | G | B |

Evaluation: G: Good M: Fair B: Poor

Examination Conditions (Methods):

(1) Electromagnetic Characteristics 1) 7 MHz Output

The output level for signals of a recording wavelength (frequency) of 7 MHz is shown in terms of relative value based on the output level of an SHG 8-mm tape produced by Fuji Film Co., Ltd., with the latter output level being taken as 0 dB.

2) 7 MHz C/N

The ratio of the output of signals of a recording wavelength of 7 MHz to noise level at 6 MHz is shown in terms of relative value based on the output and noise level for an SHG 8-mm tape manufactured by Fuji Film Co., Ltd. which were taken as 0 dB.

(2) Still Life (Durability)

Signals recorded on each video tape were reproduced in still mode, and the time period required for the video output to decrease by 6 dB was measured.

VTR=Fujix 8

Environment=5° C.

(3) Edge Damage

In a high-humidity environment of 25° C. 80%, each video tape was subjected to 100-pass running. After the running, the tape was examined for damage level.

(4) Clogging

In a low-temperature environment of 25° C. 10%, signals recorded on each video tape were reproduced repeatedly over a 120-minute length using Fujix 8.

Ten reels were thus run, and the tape was evaluated based on the number of reels that had caused clogging.

As is apparent from the results in Table 1, the magnetic recording media of Examples 1 to 5 according to the present invention were superior in electromagnetic characteristics, such as, output and C/N at 7 MHz and showed excellent effects in all of the evaluation items of still life (durability) (5° C.), edge damage (25° C., 80% RH), and clogging (25° C., 10% RH). In contrast, the magnetic recording media of the Comparative Examples 1 to 3, in which the second magnetic layers employed abrasives having a pH of 7 or more, were considerably inferior in still life (durability) (5° C.) and clogging (25° C., 10% RH).

The magnetic recording medium of the present invention has been improved in all of electromagnetic characteristics, running durability, and still durability due to the incorporation of nonmagnetic particles having a pH of less than 7 and a Mohs' hardness of 6 or more in the second magnetic layer in a predetermined amount, and the incorporation of nonmagnetic particles having a pH of 7 or more and a Mohs' hardness of 6 or more in the first magnetic layer in a predetermined amount, especially when the magnetic layers contain a binder having an acid polar group. In particular, durability in low-temperature, low-humidity, or high-humidity environments has been improved.

While the invention has been described in detail and with reference to specific examples thereof, it will be apparent to one skilled in the art that various changes and modifications can be made therein without departing from the spirit and scope thereof.

What is claimed is:

1. A magnetic recording medium comprising a first magnetic layer and a second magnetic layer which have been provided in this order on a surface of a nonmagnetic support, and which contain ferromagnetic particles and a binder, wherein said second magnetic layer contains nonmagnetic particles selected from the group consisting of $Cr_2O_3$, $\alpha$-$Fe_2O_3$, SiC, $TiO_2$, $ZrO_2$ and particles obtained by coating nonmagnetic powder particles having a Mohs' hardness of 6 or more with $Cr_2O_3$, $\alpha$-$Fe_2O_3$, SiC or $TiO_2$, having a pH of less than 7, and a Mohs' hardness of 6 or more, in an amount of from 1 to 20 parts by weight, per 100 parts by weight of the ferromagnetic particles in the second magnetic layer, and said first magnetic layer contains nonmagnetic particles selected from the group consisting of $\alpha$-$Al_2O_3$, $SiO_2$ and particles obtained by coating nonmagnetic powder particles having a Mohs' hardness of 6 or more with $\alpha$-$Al_2O_3$ or $SiO_2$ having a pH of 7 or more, and a Mohs' hardness of 6 or more, in an amount of from 5 to 50 parts by weight, per 100 parts by weight of the ferromagnetic particles in the first magnetic layer.

2. The magnetic recording medium as in claim 1, wherein the binder contained in each of the first magnetic layer and the second magnetic layer comprises a binder containing at least one polar group selected from the group consisting of —$SO_3M$, —$OSO_3M$, —$PO(OM')_2$, —$OPO(OM')_2$, and —COOH, wherein M represents a hydrogen atom or an alkali metal atom and M' represents a hydrogen atom, an alkali metal atom, or a lower hydrocarbon group.

3. The magnetic recording medium as in claim 1, wherein the ferromagnetic particles contained in the second magnetic layer are ferromagnetic metal particles having a specific surface area measured by the BET method of 45 $m_2$/g or more.

4. The magnetic recording medium as in claim 1, wherein the ferromagnetic particles contained in the first magnetic layer and in the second magnetic layer comprise materials selected from the groups consisting of magnetic metal oxides, magnetic metals and metal alloys, and mixtures thereof.

5. The magnetic recording medium as in claim 1, wherein the nonmagnetic particles in the second magnetic layer are present in an amount of from 2 to 15 parts by weight per 100 parts by weight of the ferromagnetic particles in the second magnetic layer.

6. The magnetic recording medium as in claim 1, wherein the nonmagnetic particles in the first magnetic layer are present in an amount of from 5 to 30 parts by weight per 100 parts by weight of the ferromagnetic particles in the first magnetic layer.

7. The magnetic recording medium as in claim 1, wherein the binder contained in the the first and second magnetic layers comprises:

(1) thermoplastic resins selected from the group consisting of vinyl chloride-vinyl acetate copolymers, vinyl chloride copolymers, vinyl chloride-vinylidene chloride copolymers, vinyl chloride-acrylonitrile copolymers, acrylic acid ester-acrylonitrile copolymers, acrylic acid ester-vinylidene chloride copolymers, acrylic acid ester-styrene copolymers, methacrylic acid ester-acrylonitrile copolymers, methacrylic acid ester-vinylidene chloride copolymers, methacrylic acid ester-styrene copolymers, urethane elastomers, nylon-silicone resins, nitrocellulose-polyamide resins, poly (vinyl fluoride), vinylidene chloride-acrylonitrile copolymers, butadiene-acrylonitrile copolymers, polyamide resins, poly(vinyl butyral), cellulose derivatives, styrene-butadiene copolymers, polyester resins, chlorovinyl ether-acrylic acid ester copolymers, amino resins, thermoplastic resins of various synthetic rubbers, and mixtures thereof; or (2) thermosetting resins or reactive resins selected from the group consisting of phenolic resins, phenoxy resins, epoxy resins, thermosetting polyurethane resins, urea resins, melamine resins, alkyd resins, silicone resins, reactive acrylic resins, epoxy-polyamide resins, nitrocellulose-melamine resins, mixtures of a high molecular-weight polyester resin and an isocyanate prepolymer, mixtures of a methacrylate copolymer and a diisocyanate prepolymer, mixtures of a polyester polyol and a polyisocyanate, urea-formaldehyde resins, mixtures of low molecular-weight glycol/a high molecular-weight diol/triphenyl-methane triisocyanate, polyamine resins, polyimine resins, and mixtures thereof.

8. The magnetic recording medium as in claim 1, wherein the ferromagnetic particles contained in the second magnetic layer are selected from the group consisting of magnetic metal oxides, magnetic metals and magnetic metal alloys, and the ferromagnetic particles contained in the first magnetic layer are magnetic metal oxides.

9. The magnetic recording medium as in claim 1, wherein the ferromagnetic particles contained in the first and second magnetic layers have particle lengths from about 0,005 to 1 micron, and the ratio of length in the long axis to length in the short axis is from about 1/1 to 50/1.

10. The magnetic recording medium as in claim 1, wherein the ferromagnetic particles contained in the first and second magnetic layers contain at least one metal selected from the group consisting of Sr, Pb, Mn, Ni, Cd, Cr, Al, Si, Ti, Cu and Zn in an amount of no more than 1 wt%.

11. The magnetic recording medium as in claim 1, wherein the first and second magnetic layers contain at least one compound selected from the group consisting of fatty acid modified silicone oils, fatty acid esters, fatty acid and fatty acid amide.

* * * * *